(12) United States Patent
Kiefer

(10) Patent No.: US 7,516,518 B2
(45) Date of Patent: Apr. 14, 2009

(54) ASSEMBLY COMPRISING A DOOR LEAF AND HINGES, AND A SHOWER STALL

(75) Inventor: Zoltan Anton Kiefer, Mainz (DE)

(73) Assignee: NAOMI Rechte GmbH, Osnabruck (DE)

( * ) Notice: Subject to any disclaimer, the term of this patent is extended or adjusted under 35 U.S.C. 154(b) by 171 days.

(21) Appl. No.: 10/512,708

(22) PCT Filed: Apr. 25, 2003

(86) PCT No.: PCT/EP03/04317

§ 371 (c)(1),
(2), (4) Date: Nov. 19, 2004

(87) PCT Pub. No.: WO03/093617

PCT Pub. Date: Nov. 13, 2003

(65) Prior Publication Data

US 2005/0166366 A1    Aug. 4, 2005

(30) Foreign Application Priority Data

Apr. 30, 2002    (DE) ................................ 102 19 232

(51) Int. Cl.
*E05D 5/02*    (2006.01)
(52) U.S. Cl. ................ 16/252; 16/383; 4/607; 411/55; 411/45; 403/277
(58) Field of Classification Search .............. 16/252, 16/253, 235, 383, 384; 4/557, 607; 411/55, 411/182, 45, 398; 280/86.753; 403/277, 403/281, 283, 239, 242
See application file for complete search history.

(56) References Cited

U.S. PATENT DOCUMENTS

| 3,197,806 | A | * | 8/1965 | Ennis .......................... 16/383 |
| 4,519,735 | A | * | 5/1985 | Machtle ....................... 411/65 |
| 4,883,395 | A | * | 11/1989 | Klaric .......................... 411/55 |
| 5,718,547 | A |   | 2/1998 | Eischeid |
| 2002/0116787 | A1 | * | 8/2002 | Miller et al. .................. 16/252 |

FOREIGN PATENT DOCUMENTS

DE    299 23 347 U 1    10/2000
EP        387207 A1 *    9/1990

\* cited by examiner

*Primary Examiner*—William L. Miller
(74) *Attorney, Agent, or Firm*—Hamilton, Brook, Smith & Reynolds, P.C.

(57) ABSTRACT

The invention relates to an assembly comprising a door leaf (1), which has at least two undercut blind holes (26), and comprising at least two hinges (3) each consisting of a door-side and a wall-side hinge part (4,5). In order to fasten the door-side and/or wall-side hinge part, expanding plugs (20) are provided that have a distal expanding element (22) as well as a retaining and stop element (23). In addition, an expanding/fastening element (21) is provided that serves to expand the expanding elements and to fasten the hinge to the expanding plug. The expanding/fastening element can comprise a screw bolt (26) and a nut (28) or a mounting part (30) with a hole for accommodating a screw (31), with which the mounting part is screwed to the expanding plug. The invention also relates to a shower stall having one or more lateral walls and one or more assemblies of the aforementioned type.

16 Claims, 4 Drawing Sheets

ASSEMBLY COMPRISING A DOOR LEAF AND HINGES, AND A SHOWER STALL

This application is the U.S. National Stage of International Application No. PCT/EP03/04317, filed Apr 25, 2003, published in German, and claims priority under 35 U.S.C. §119 or 365 to German Application No. 102 19 232.4, filed Apr 30, 2002.

BACKGROUND OF THE INVENTION

The invention relates to an assembly comprising a door leaf and at least two hinges. The invention also relates to a shower stall having one or more wall elements and one or more assemblies of the above kind.

Known shower stalls are generally put together on the spot from prefabricated components. There are known kits of components for shower stalls which comprise one or more wall elements and one or more door leaves, with the door leaf being fastened to the wall element by two hinges.

Fittings of a vast variety of different designs are known for assembling the components of a shower stall. The fittings in question should on the one hand allow a strong structure to be obtained and on the other hand should be able to be fitted easily. Also, the components which are connected by the fittings should, as far as possible, retain their flat surfaces. Not only is this important from the aesthetic point of view but it also makes it easier for the components to be cleaned. Projecting parts are felt to be a nuisance particularly on glass walls.

Known from DE 299 23 347 U1 is an assembly comprising a door leaf and hinges in which the hinge is fastened to the door leaf by means of retaining elements and barriers. For this purpose, the door leaf has through-holes through which the retaining elements and screws extend. Because of the through-holes, there are interruptions to the surface of the door leaf, which entails the disadvantages described above.

Known from U.S. Pat. No. 5,718,547 is a fastening means which comprises essentially an expanding element which can be inserted in a blind hole. Once the expanding element has been expanded, the fastening means is fastened securely in place in the blind hole. A pin which can be inserted in the fastening means is proposed for expanding the expending member.

SUMMARY OF THE INVENTION

The object underlying the invention is to provide an assembly comprising a door leaf and hinges which is easy to assemble and allows a strong structure with no projecting parts to be obtained. A further object of the invention is to provide a shower stall having one or more wall elements and one or more assemblies of the above kind.

The assembly according to the invention comprises a door leaf having at least two hinges and further elements for fastening the hinges to the door leaf. The hinges each have a door-side and wall-side part, and a hinge pin onto which the two hinge parts are plugged.

The fastening elements for the hinges comprise expanding plugs which have a distal expanding element and a proximal retaining and abutment element. The connecting technique is based on the expanding plugs being inserted in undercut blind holes in the door leaf. Because no through-holes are required, the door leaf retains its flat surface on the inner side.

The fastening elements also comprise expander/fastening means by which on the one hand the expanding elements of the expanding plugs are expanded and on the other hand the hinge is fastened to the door sheet.

The undercut blind holes can be made in door leaves of a vast variety of different materials by known drilling and boring processes. The door leaf is preferably composed of a mineral or plastics material. The special advantages of the connecting technique come into play particularly with door leaves made of glass.

The proximal retaining and abutment element of the expanding plug serves not only to fasten the expander/fastening means securely in place but also for the fitting of the expanding plug. The retaining and abutment element is preferably in the form of a multi-sided screw head. Basically however, any other form is possible too.

The expanding element of the expanding plug is preferably in the form of a sleeve, having expanding hooks, which is provided with an inside thread. To allow the expanding plug to be fixed securely in place, at least two, and preferably three or even more, expanding hooks should be provided. Once the expanding elements have been expanded, tensile forces are evenly distributed over the supporting surface in the blind hole.

In a preferred embodiment, the expander/fastening means have a screwed pin and a nut, with the screwed pin usefully having a polygonal socket. In this way, the screwed pin can easily be screwed into the sleeve of the expanding plug, which sleeve is provided with the inside thread, using known polygonal keys, as a result of which the expanding hooks are forced apart from one another. In this embodiment the hinge has a through-hole for the screwed pin. The though-hole is advantageously a slotted hole to allow the parts to be lined up exactly with one another.

An alternative embodiment is notable for the fact that a through-hole is not needed in the hinge. As a result of this a transverse bore in the door leaf for a screwed pin, which bore would be visible from outside, is also done away with. The expander/fastening means have, in this embodiment, an assembling part, which can be fixed into the door leaf, having a bore to receive a screw by which the assembling part is screwed to the expanding plug. The assembling part is inserted in a blind hole in the hinge part. The assembling part is preferably fixed in the blind hole in the door leaf with a clamping screw which is screwed into a longitudinal bore in the door leaf.

Exact positioning of the hinge part on the door leaf is made possible by an especially preferred embodiment in which the bore in the assembling part to receive the screw is eccentric. The precise lining up of the hinge part on the door leaf is performed simply by turning the assembling part.

Exact alignment of the parts is obtained if the head of the screw and the bore in the assembling part are tapered.

With the assembly according to the invention, shower stalls having one or more door leaves and wall elements can be constructed. When this is done, the door leaf may for example be fastened, with at least two hinges, to only one wall element, with the walls of the room forming the other two lateral boundaries. However, the shower stall may for example also be assembled from two wall elements and one door leaf. As well as this, the shower stall may also comprise two door leaves.

BRIEF DESCRIPTION OF THE DRAWING

In what follows, a number of embodiments of the invention will be described in detail by reference to the drawings.

In the drawings.

DETAILED DESCRIPTION OF THE INVENTION

Figure 1:
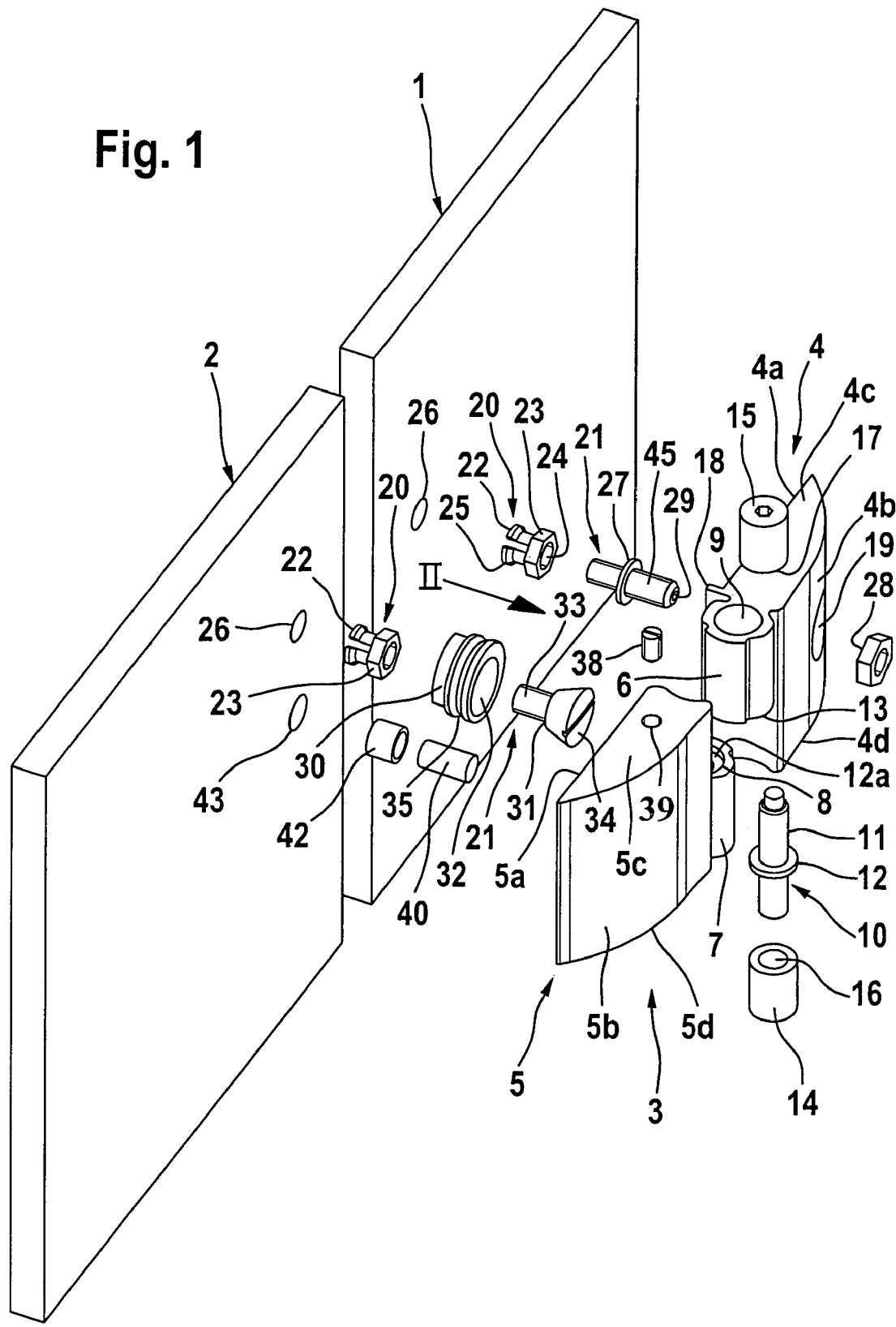
FIG. 1 shows part of a wall element and a door leaf, together with a hinge and the fastening elements required.
Figure 2:
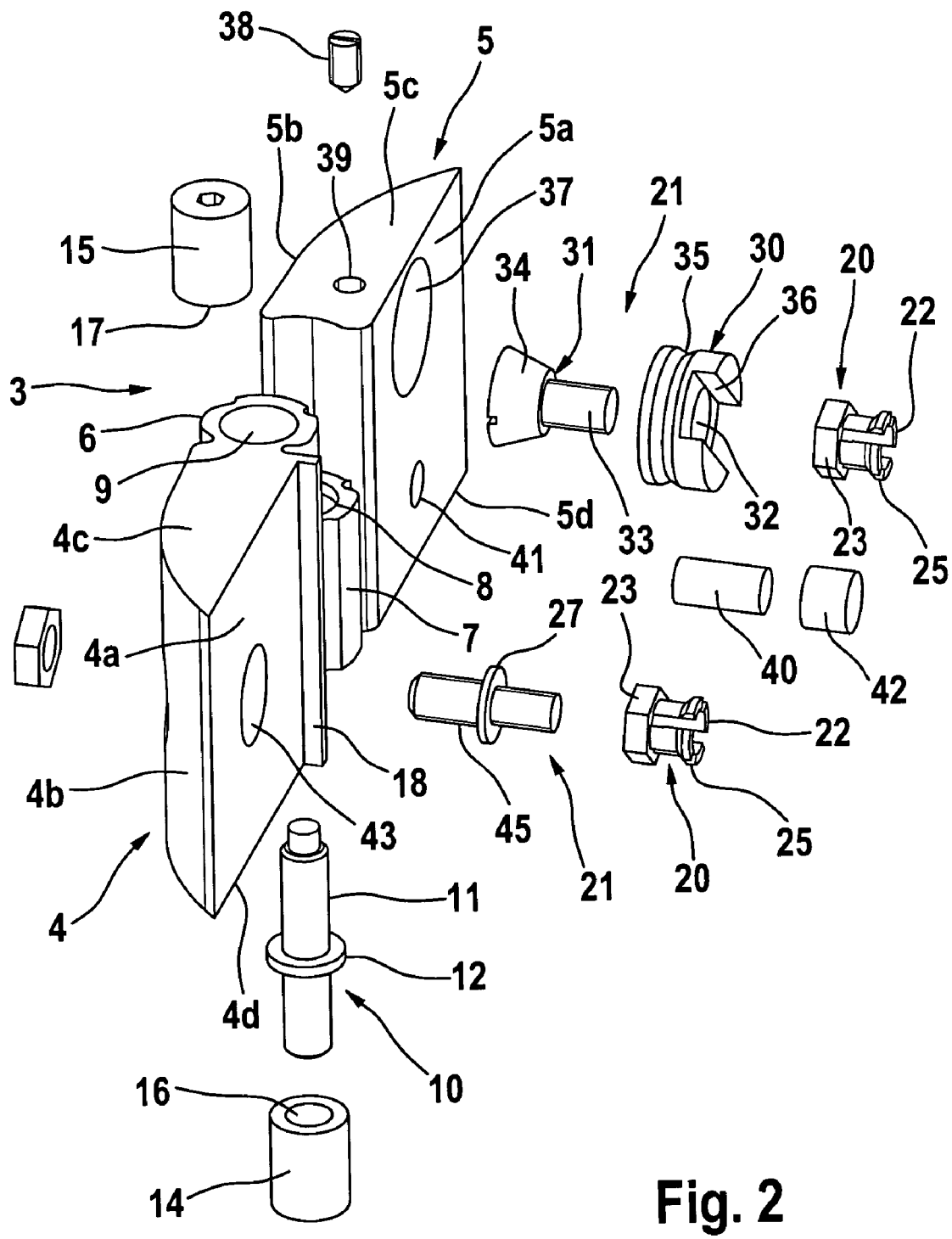
FIG. 2 is an enlarged exploded view of the hinge, together with the fastening elements, seen from the direction of arrow II in FIG. 1.
Figure 3:
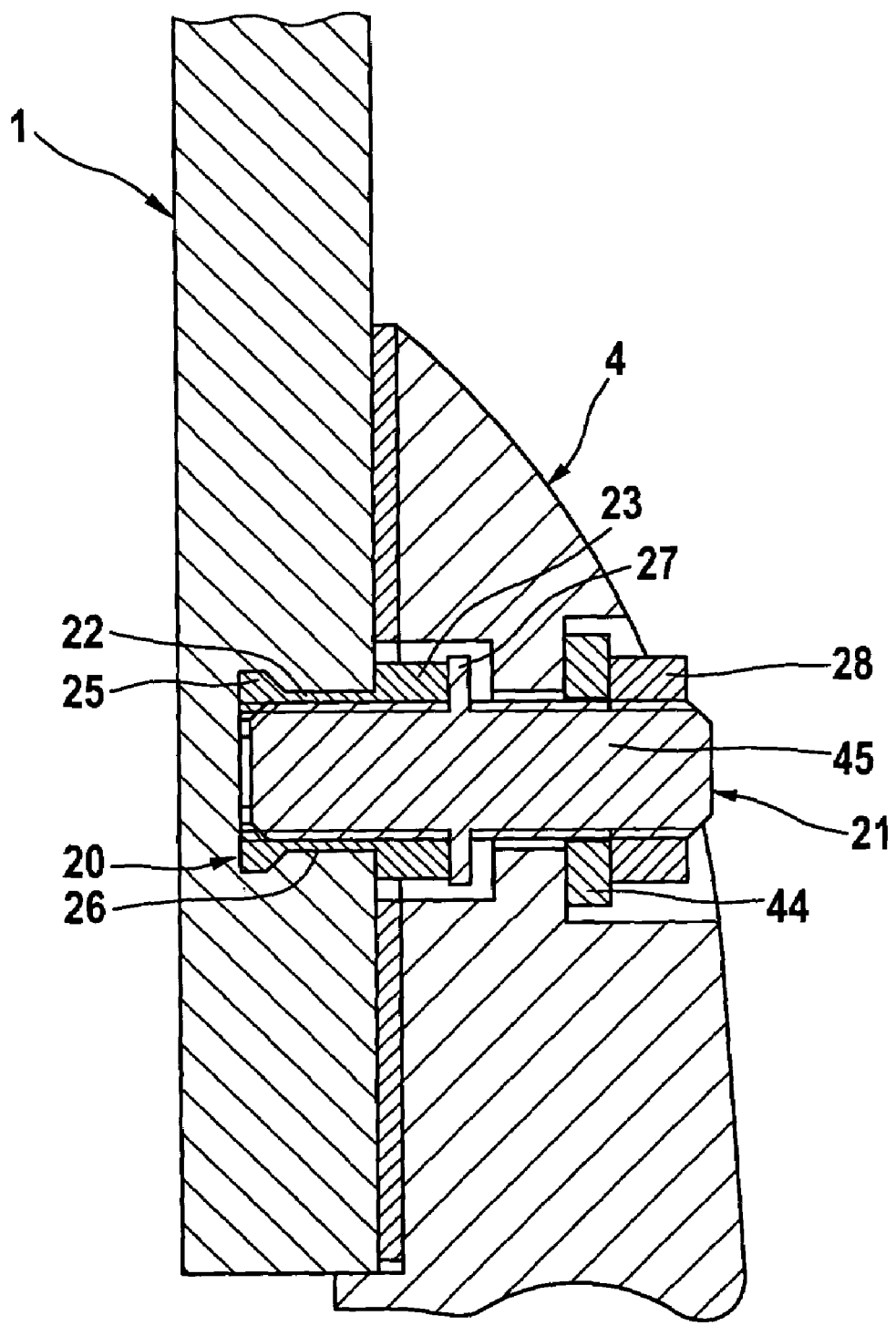
FIG. 3 is an enlarged section through the door leaf and the door-leaf-side hinge part.
Figure 4:
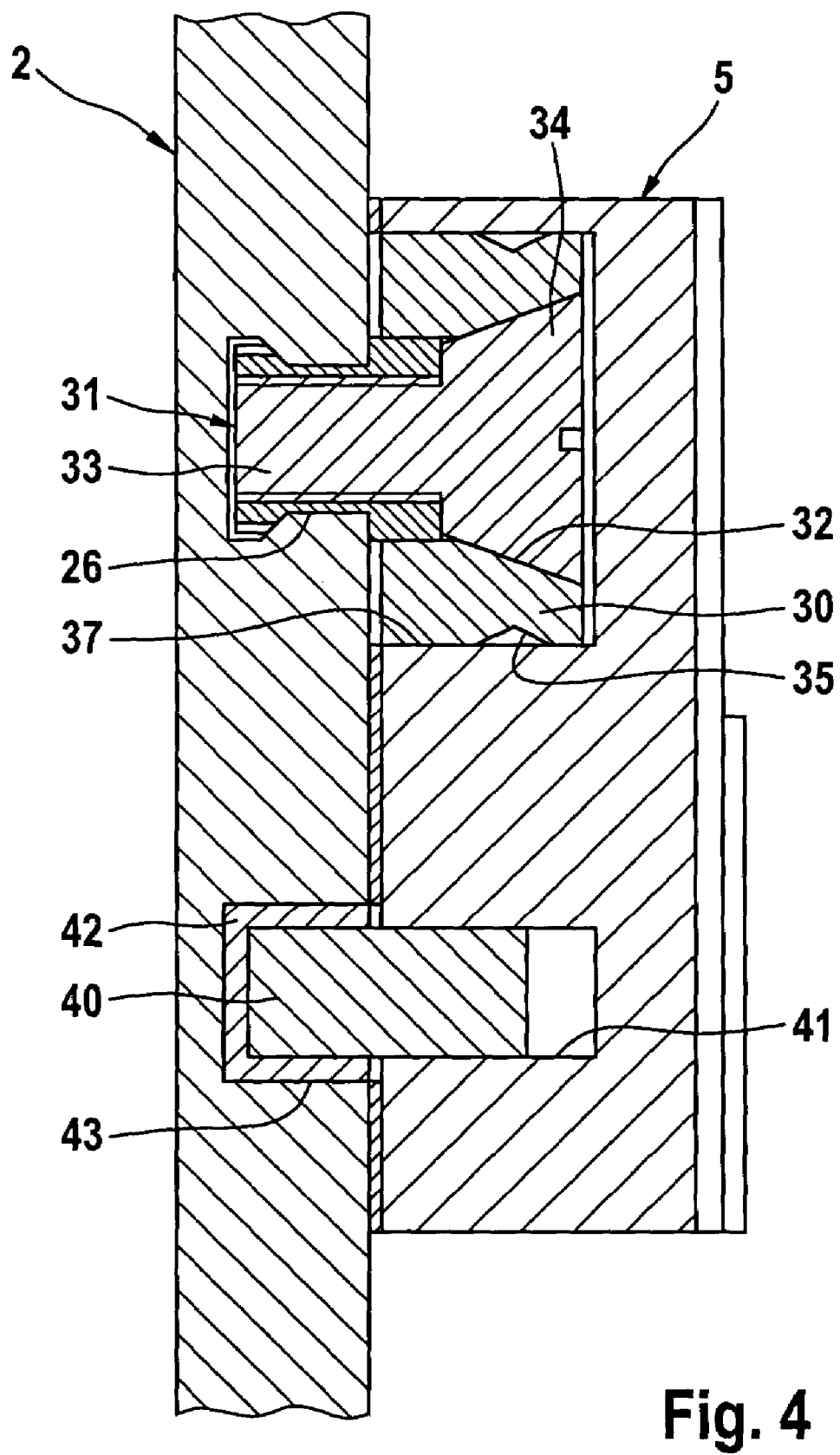
FIG. 4 is an enlarged section through the wall element and the wall-side hinge part.

FIG. 1 shows part of a door leaf 1 and a wall element 2 together with a hinge 3 and the fastening elements for the hinge. The wall element and the door leaf are rectangular sheets of glass. The door leaf is hinged to the wall element by two hinges, of which only the upper hinge is shown in FIG. 1. The upper and lower hinges and their fastening elements are identical.

The embodiment shown in FIG. 1 is used to illustrate two different connecting techniques. In practice however, it will generally be only one of the two techniques that is used in any given case.

The hinge has a door-side hinge part 4 and a wall-side hinge part 5. The two hinge parts 4, 5 have plane inner sides 4a and 5a respectively, which rest against the door leaf 1 and the wall element 2 respectively, arched outer sides 4b and 5b respectively, and plane top and bottom sides 4c, 4d and 5c, 5d respectively.

On the longitudinal sides situated in the centre, the hinge parts 4, 5 have upper and lower receiving portions 6 and 7 respectively having cylindrical longitudinal bores 8 and 9 respectively for a hinge pin 10. The hinge pin 10 is a cylindrical metal pin 11 having a circumferential projection 12 between its ends. The circumferential projection 12 on the hinge pin 10 is inserted as a good fit in the cylindrical depressions 12a, 13 in the receiving portions 6, 7, which depressions 12a, 13 are formed by circumferential rims in the longitudinal bores 8, 9 in the receiving portions 6, 7, with the metal pin extending into the receiving portions through one bore in each case. The longitudinal bores 8, 9 in the receiving portions 6, 7 are closed off by the respective plugs 14, 15 which have cylindrical bores 16, 17 into which the metal pin 11 forming the hinge pin 10 extends.

In principle, the two hinge parts 4, 5 are identical. However, in a preferred embodiment the door-side hinge part 4 has, to secure it against turning, a longitudinally extending stop member 18 by which the door-side hinge part 4 bears against the longitudinal edge of the door leaf.

In what follows, the connecting technique used for the door-side hinge part 4 will be described in detail, in which case the wall-side hinge part 5 may also use the same connecting technique. This connecting technique presupposes that a transverse bore 19 is provided in the hinge part 4. The connecting elements for fastening the door-side hinge part 4 to the door leaf 1 comprise an expanding plug 20 and expander and fastening means 21. The expanding plug 20 has a distal expanding element 22 and a proximal retaining and abutment element 23.

The distal expanding element 22 is a sleeve provided with an inside thread, which sleeve is slotted in the longitudinal direction to form three projecting expanding hooks 25. The proximal retaining and abutment element 23 is in the form of a multi-sided screw head.

The expanding plug is anchored solidly in place in an undercut blind hole 26 in the door leaf 1. Methods of making the blind hole 26 are known in which, in one operation with one tool, a cylindrical bore is made and is then undercut to a taper.

The expander/fastening means 21 comprise a screwed pin 45 which has a circumferential projection 27 between its ends, and a nut 28 which has, if required, a washer 44. The end of the screwed pin 45 which points outwards is provided with a polygonal socket 29, preferably to receive a hexagonal key.

The door-side hinge part 4 is fitted to the door leaf 1 as follows. The expanding plug 20 is first inserted in the undercut blind hole 26 by its expanding element 22. The screwed pin 45 is then screwed into the expanding element 22 with a hexagon key, as a result of which the expanding hooks 25 of the expanding member are expanded. The screwed pin has now been solidly anchored to the door leaf. The hinge part 4 is then screwed solidly to the screwed pin 45.

In what follows, the alternative connecting technique for the wall-side hinge part 5 will be described. This connecting technique can also be used for the door-side hinge part 4 so that the two hinge parts and their fastening elements are identical. Parts which correspond to one another have been given the same reference numerals.

The alternative connecting technique employs the same expanding plug 20, which is solidly anchored in an undercut blind hole 26 in the wall element 2. A transverse hole is not however required in the wall-side hinge part 5. This is also the reason why no connecting elements are visible on the outer side 5d of the hinge part.

In the alternative embodiment, the expander/fastening means 21 comprise an assembling part 30, and a screw 31 by which the assembling part is screwed to the expanding plug 20. The assembling part 30 has an eccentric hole 32 to receive the shank 33 of the screw 31. The head 34 of the screw 31, and the hole 32 in the assembling part 30 are tapered. In its circumference, the assembling part 30 has a circumferential groove 35 and, in the end face adjacent the wall element 2, a recess 36 to receive, and secure against turning, the proximal retaining and abutment element 23 of the expanding plug 20. The proximal retaining and abutment element 23 is in the form of a multi-sided screw head.

Provided in the inner side 5a of the wall-side hinge part 5 is a cylindrical blind hole 37 in which the assembling part 30 can be inserted as a good fit. To fix the assembling part 30 in the blind hole 37, use is made of a clamping screw 38 which is screwed into a longitudinal hole 39 in the upper side 5c of the wall-side hinge part 5. The longitudinal hole 39 is so arranged that the clamping screw 38 extends into the circumferential groove 35 in the assembling part 30.

To secure the wall-side hinge part against turning, there is an additional pin 40 provided which is inserted on the one hand into a fitted blind hole 41 below the blind hole 37 for the assembling part 30 and one the other hand into a corresponding sleeve 42 which is inserted in turn into a fitted blind hole 43 in the floor element 2 below the blind hole 26 for the expanding plug 20. However, for security against turning, it is also possible for the longitudinally extending stop member 18 which the door-side hinge part 4 has to be provided on the wall-side hinge part 5, rather than the additional pin.

The wall-side hinge part 5 is fitted to the wall element 2 as follows. Once the expanding plug 20 has been anchored in the undercut blind hole 26, the assembling part 30 is fitted onto the proximal retaining and abutment element 23 of the expanding plug 20 and the screw 31 is screwed into the expanding plug 20. The proximal retaining and abutment element 23 is in the form of a multi-sided screw head. The assembling part 30 is then inserted in the blind hole 37 in the wall-side hinge part 5 and the clamping screw 38 is screwed into the hinge part. In this way, the assembling part is anchored solidly to the hinge part.

Because the second hinge by which the door leaf is hinged to the wall element is identical to the first hinge there is no need for any further description of it or for it to be shown in a drawing. In this case too, all the variations which arise as a result of the different connecting techniques are again possible. With very heavy door leaves however, there may also be more than two hinges provided.

The invention claimed is:

1. An assembly comprising:
    a door leaf;
    a hinge comprising a door-side and a wall-side hinge part, each having a longitudinal bore;
    a hinge pin onto which the door-side and wall-side hinge parts can be plugged through the respective longitudinal bores;
    an expanding plug having a distal expanding element and a proximal retaining and abutment element; an expander/fastening element having an expander portion for expanding the expanding plug and a fastening portion to which the hinge is fastened, the fastening portion in direct contact with the hinge;
    the door leaf having the undercut blind hole in which an expanding plug is inserted, the undercut blind hole defined by a cylindrical bore undercut to a taper; and
    the distal expanding element of the expanding plug in the form of a body having expanding hooks, the expanding hooks received in the taper when expanded by the expander portion of the expander/fastening element.

2. The assembly according to claim 1, characterized in that the proximal retaining and abutment element of the expanding plug is in the form of a multi-sided screw head.

3. The assembly according to claim 1, characterized in that the expander portion is a screwed pin and the fastening portion is a nut.

4. The assembly according to claim 3, characterized in that the screwed pin has a polygonal socket.

5. The assembly according to claim 1, characterized in that the door-side hinge part has a slotted through hole preferably a slotted hole.

6. The assembly according to claim 1, characterized in that the fastening portion is able to be fixed in the wall-side hinge part and has a bore to receive the expander portion which is a screw having a shank and a head, by which the fastening portion can be screwed to the expanding plug.

7. The assembly according to claim 6, characterized in that the bore in the fastening portion is eccentric.

8. The assembly according to claim 6, characterized in that the head of the screw and the bore in the fastening portion are tapered.

9. The assembly according to claim 6, characterized in that a blind hole to receive the fastening portion is provided in the wall-side hinge part.

10. The assembly according to claim 9, characterized in that the fastening portion can be fixed in the hinge part by a clamping screw which can be screwed into a bore in the wall-side hinge part.

11. The assembly according to claim 1, characterized in that the hinge pin has a circumferential projection.

12. The assembly according to claim 1, characterized in that the door leaf is composed of a mineral or plastics material.

13. The assembly of claim 1, characterized in that the fastening portion of the expander/fastening element is in direct contact with the door-side hinge part.

14. The assembly of claim 1, characterized in that the expander portion has a circumferential projection between its ends.

15. The assembly of claim 14, characterized in that the circumferential projection of the expander portion is in direct contact with the proximal retaining and abutment element of the expanding plug.

16. A shower stall comprising:
    one or more side-walls; and one or more assemblies, each assembly comprising:
    a door leaf;
    a hinge comprising a door-side and a wall-side hinge part, each having a longitudinal bore;
    a hinge pin onto which the door-side and wall-side hinge parts can be plugged through the respective longitudinal bores; and
    an expanding plug having a distal expanding element and a proximal retaining and abutment element; an expander/fastening element having an expander portion for expanding the expanding plug and a fastening portion to which the hinge is fastened, the fastening portion in direct contact with the hinge; the door leaf having an undercut blind hole in which the expanding plug is inserted, the undercut blind hole defined by a cylindrical bore undercut to a taper, the distal expanding element of the expanding plug in the form of a body having expanding hooks received in the taper when expanded by the expander portion of the expander/fastening element.

* * * * *

UNITED STATES PATENT AND TRADEMARK OFFICE
CERTIFICATE OF CORRECTION

| | | |
|---|---|---|
| PATENT NO. | : 7,516,518 B2 | |
| APPLICATION NO. | : 10/512708 | |
| DATED | : April 14, 2009 | |
| INVENTOR(S) | : Zoltan Anton Kiefer | |

It is certified that error appears in the above-identified patent and that said Letters Patent is hereby corrected as shown below:

<u>Column 5</u>

Lines 40 and 41, delete "preferably a slotted hole"

Signed and Sealed this

Thirtieth Day of June, 2009

JOHN DOLL
*Acting Director of the United States Patent and Trademark Office*